(12) United States Patent
Iwazaki et al.

(10) Patent No.: US 11,389,952 B2
(45) Date of Patent: Jul. 19, 2022

(54) ROBOT ARM

(71) Applicant: Seiko Epson Corporation, Tokyo (JP)

(72) Inventors: Tomohisa Iwazaki, Shimosuwa (JP); Yutaka Arakawa, Hara (JP); Mitsuru Toyama, Azumino (JP)

(73) Assignee: Seiko Epson Corporation

( * ) Notice: Subject to any disclaimer, the term of this patent is extended or adjusted under 35 U.S.C. 154(b) by 8 days.

(21) Appl. No.: 16/522,786

(22) Filed: Jul. 26, 2019

(65) Prior Publication Data

US 2020/0030969 A1 Jan. 30, 2020

(30) Foreign Application Priority Data

Jul. 27, 2018 (JP) .............................. JP2018-141031

(51) Int. Cl.
*B25J 9/12* (2006.01)
*B25J 17/02* (2006.01)
*B25J 9/16* (2006.01)
*B25J 18/00* (2006.01)

(52) U.S. Cl.
CPC ............ *B25J 9/126* (2013.01); *B25J 9/1612* (2013.01); *B25J 17/025* (2013.01); *B25J 18/00* (2013.01)

(58) Field of Classification Search
CPC ...... B25J 9/126; B25J 17/025; B25J 17/0241; B25J 17/0283; B25J 17/0258; B25J 9/1612; B25J 18/00
USPC ...................................................... 74/490.03
See application file for complete search history.

(56) References Cited

U.S. PATENT DOCUMENTS

| | | | | |
|---|---|---|---|---|
| 4,518,307 A | * | 5/1985 | Bloch | B25J 17/0208 414/729 |
| 4,657,473 A | * | 4/1987 | Banovic | B25J 17/025 414/739 |
| 4,688,984 A | * | 8/1987 | Nakashima | B25J 9/1025 414/735 |
| 4,899,637 A | * | 2/1990 | Caruso | B25J 9/148 137/580 |
| 5,015,821 A | * | 5/1991 | Sartorio | B25J 9/042 219/124.34 |

(Continued)

FOREIGN PATENT DOCUMENTS

| | | | | |
|---|---|---|---|---|
| DE | 3717597 A1 | * | 1/1988 | ............ B25J 17/025 |
| FR | 1266080 A | * | 7/1961 | ............ B25J 17/025 |

(Continued)

*Primary Examiner* — Jake Cook
*Assistant Examiner* — T. Scott Fix
(74) *Attorney, Agent, or Firm* — Harness, Dickey & Pierce, P.L.C.

(57) ABSTRACT

A robot arm includes a distal end unit having a gripping part and a first supporting part that supports the gripping part, a first drive unit that, with an axis along a direction in which the gripping part and the first supporting part are arranged as a first axis, pivots the gripping part about a first pivot axis along the first axis relative to the first supporting part, a second supporting part that supports the first supporting part, and a second drive unit that, with an axis orthogonal to the first axis as a second axis, pivots the distal end unit about a second pivot axis along the second axis relative to the second supporting part, wherein the first drive unit includes a piezoelectric motor, and the second pivot axis crosses the distal end unit.

7 Claims, 8 Drawing Sheets

(56) References Cited

U.S. PATENT DOCUMENTS

| | | | | |
|---|---|---|---|---|
| 5,178,031 A * | 1/1993 | Orsi | ................. | B25J 9/1025 |
| | | | | 318/568.11 |
| 5,178,032 A * | 1/1993 | Zona | ................. | B25J 17/025 |
| | | | | 74/479.01 |
| 5,231,889 A * | 8/1993 | Lee | ................. | B25J 17/025 |
| | | | | 74/479.01 |
| 5,523,662 A * | 6/1996 | Goldenberg | ........... | B25J 9/06 |
| | | | | 318/568.11 |
| 5,525,027 A * | 6/1996 | Jinno | ................ | B25J 5/007 |
| | | | | 114/222 |
| 9,888,966 B2 * | 2/2018 | Farritor | ............. | A61B 34/30 |
| 2002/0120254 A1 * | 8/2002 | Julian | ............... | A61B 34/35 |
| | | | | 606/1 |
| 2003/0221504 A1 * | 12/2003 | Stoianovici | ......... | B25J 9/102 |
| | | | | 74/490.04 |
| 2009/0024142 A1 * | 1/2009 | Ruiz Morales | ...... | A61B 34/35 |
| | | | | 606/130 |
| 2014/0137691 A1 * | 5/2014 | Nogami | .............. | B25J 17/02 |
| | | | | 74/490.06 |
| 2016/0114492 A1 * | 4/2016 | Arakawa | ............ | B25J 9/126 |
| | | | | 414/735 |
| 2016/0311120 A1 * | 10/2016 | Goto | ................. | B25J 19/0029 |
| 2017/0274524 A1 * | 9/2017 | Inoue | ................ | B25J 9/102 |
| 2019/0009417 A1 * | 1/2019 | Ogata | ................ | B25J 19/0029 |
| 2019/0099880 A1 * | 4/2019 | Niu | ................... | B25J 19/0004 |
| 2019/0126474 A1 * | 5/2019 | Skogsrud | ............ | G05B 13/04 |
| 2019/0193286 A1 * | 6/2019 | Hasuo | ............... | B25J 9/102 |
| 2019/0291268 A1 * | 9/2019 | Adachi | ............. | B25J 9/108 |
| 2019/0350662 A1 * | 11/2019 | Huang | .............. | A61B 34/74 |
| 2020/0332946 A1 * | 10/2020 | Kawamori | ......... | F16M 11/123 |

FOREIGN PATENT DOCUMENTS

| | | | | |
|---|---|---|---|---|
| FR | 2559283 A1 * | 8/1985 | ........... | B25J 13/02 |
| GB | 2119855 A * | 11/1983 | ........... | B25J 9/148 |
| JP | 2009-078312 A | 4/2009 | | |
| JP | 2010-105081 A | 5/2010 | | |
| JP | 2016-078208 A | 5/2016 | | |
| WO | WO-8500549 A * | 2/1985 | ......... | B25J 17/0258 |
| WO | WO-9417966 A1 * | 8/1994 | ........... | B25J 9/105 |

* cited by examiner

FIG. 8

ROBOT ARM

The present application is based on, and claims priority from, JP Application Serial Number 2018-141031, filed Jul. 27, 2018, the disclosure of which is hereby incorporated by reference herein in its entirety.

BACKGROUND

1. Technical Field

The present disclosure relates to a robot arm.

2. Related Art

For example, a robot system disclosed in JP-A-2010-105081 has an articulated robot including a gripping device, and a palette that holds works to be gripped by the gripping device of the articulated robot in random arrangement. Further, the palette has a bottom surface and a wall surface stood from the bottom surface and the bottom surface and the wall surface relatively move upward and downward. Accordingly, the shape of the palette may be changed and an interference between the palette and the gripping device may be suppressed. As a result, the works within the palette are easily gripped.

However, in the robot system having the above described configuration, there is a problem that the configuration of the palette is complicated.

SUMMARY

A robot arm according to an aspect of the present disclosure includes a distal end unit having a gripping part and a first supporting part that supports the gripping part, a first drive unit that, with an axis along a direction in which the gripping part and the first supporting part are arranged as a first axis, pivots the gripping part about a first pivot axis along the first axis relative to the first supporting part, a second supporting part that supports the first supporting part, and a second drive unit that, with an axis orthogonal to the first axis as a second axis, pivots the distal end unit about a second pivot axis along the second axis relative to the second supporting part, wherein the first drive unit includes a piezoelectric motor, and the second pivot axis crosses the distal end unit.

DESCRIPTION OF EXEMPLARY EMBODIMENTS

As below, a robot arm according to the present disclosure will be explained in detail based on preferred embodiments shown in the accompanying drawings.

First Embodiment

Figure 1:
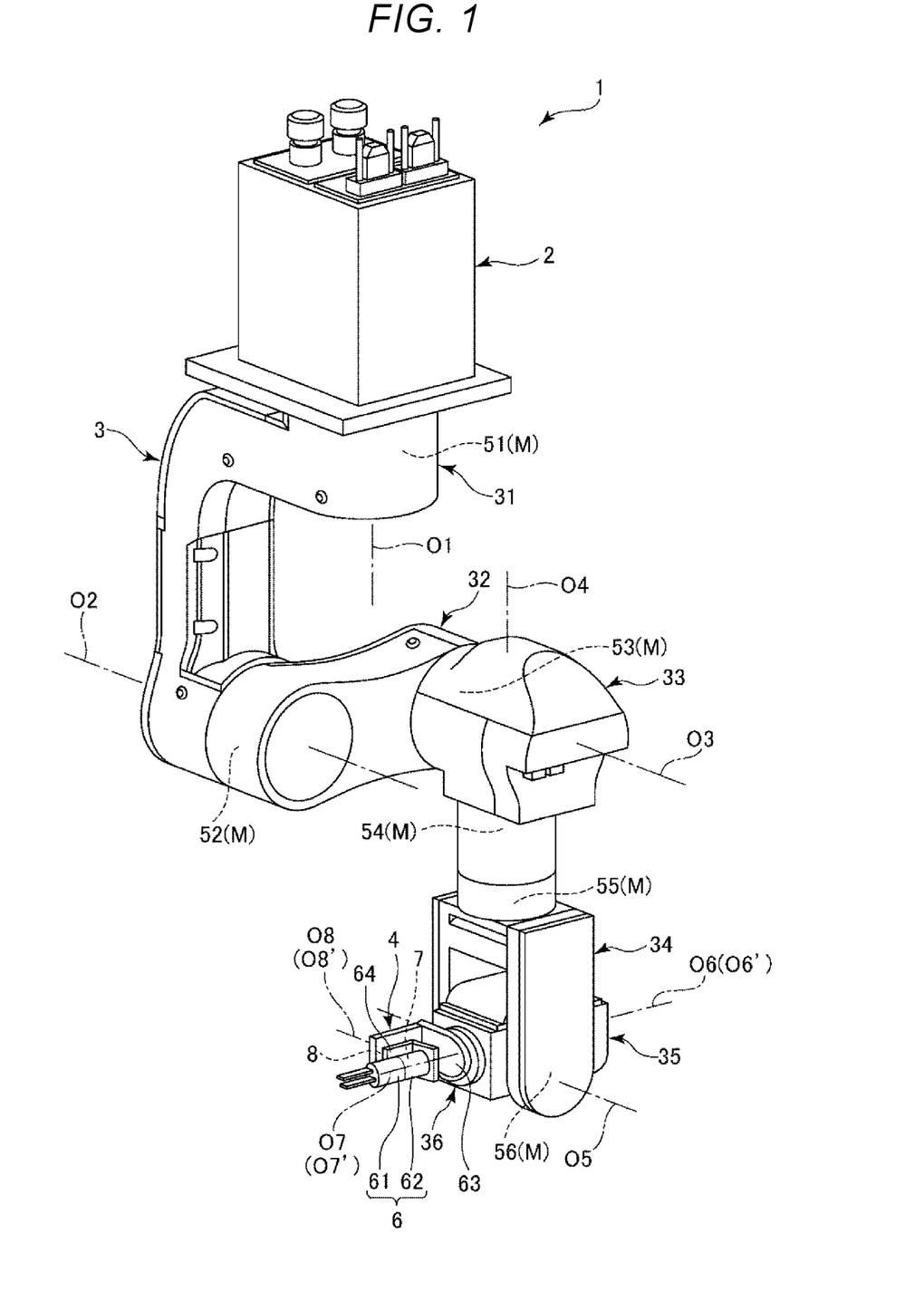
FIG. 1 is a perspective view showing a robot according to a first embodiment of the present disclosure.
Figure 2:
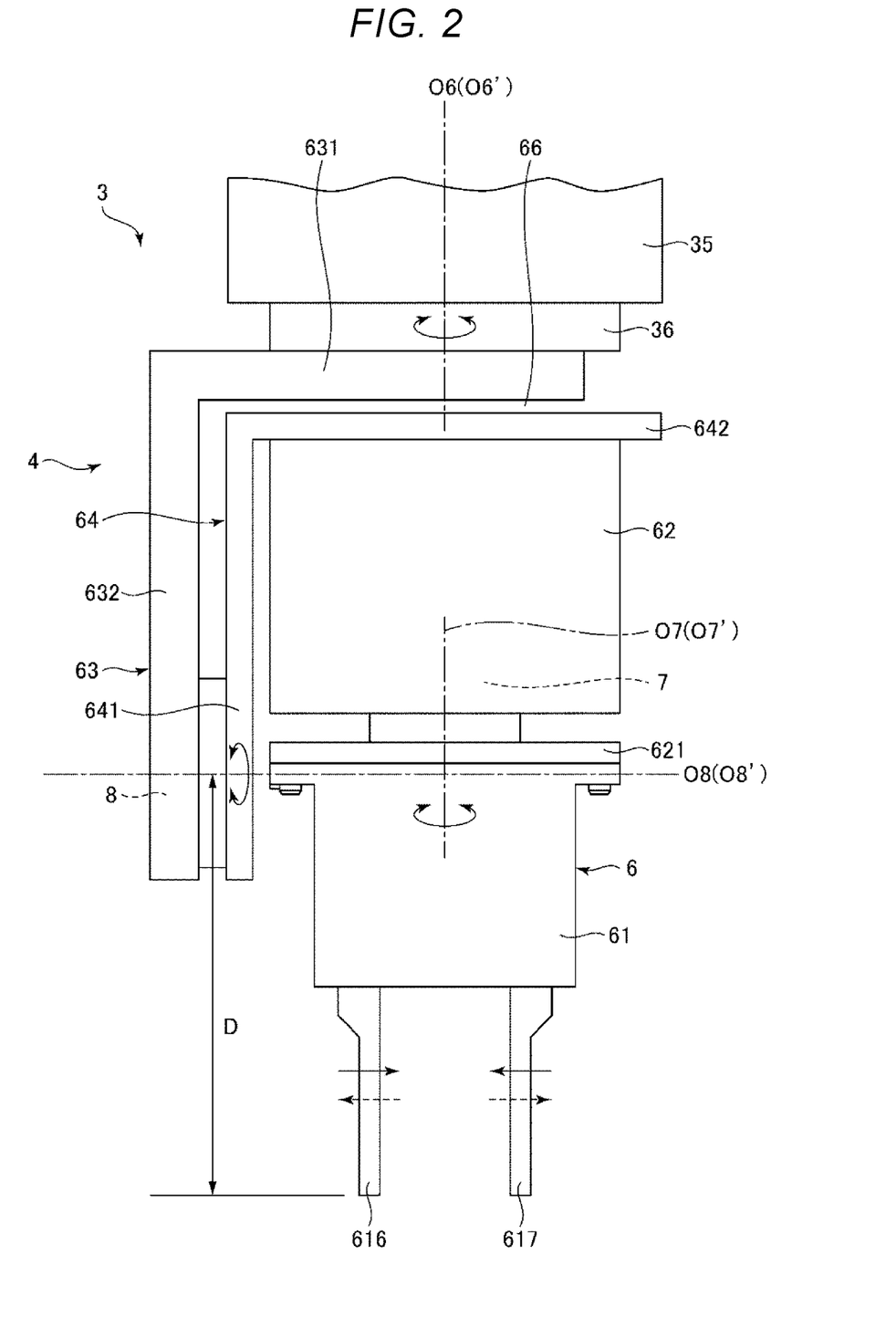
FIG. 2 is a plan view showing an end effector of the robot.
Figure 3:
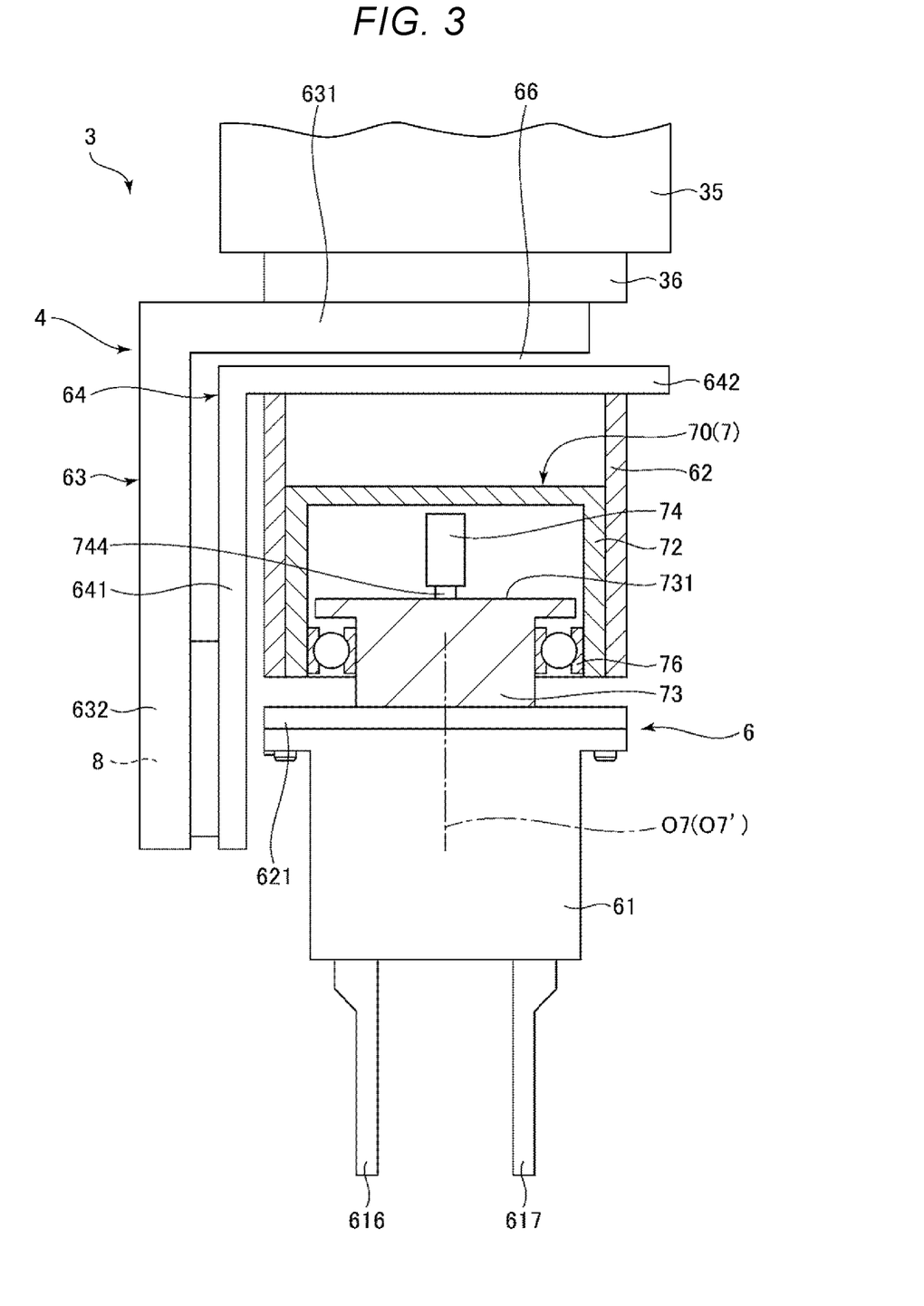
FIG. 3 is a sectional view showing a first drive unit of the end effector in FIG. 2.
Figure 4:
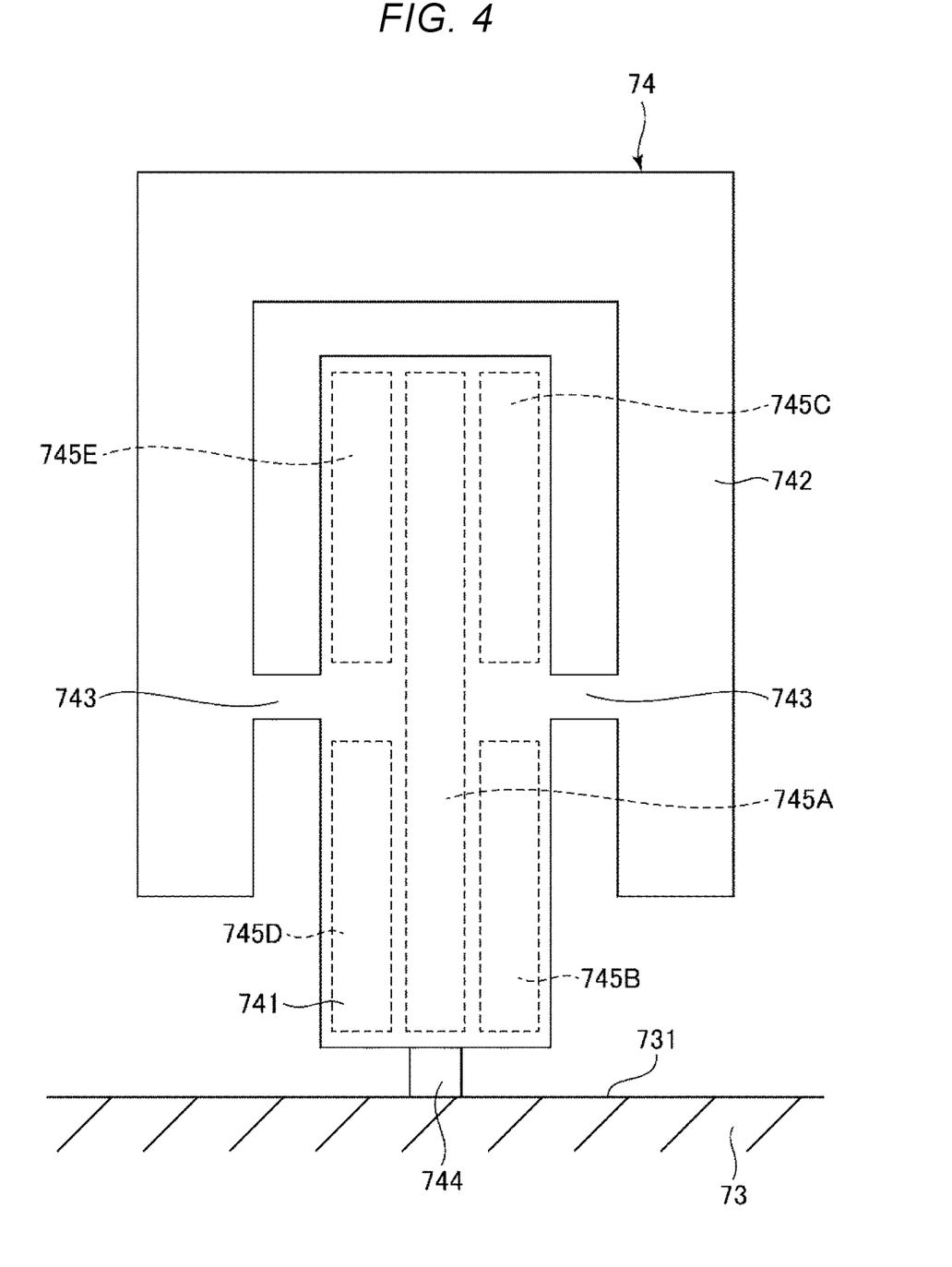
FIG. 4 is a plan view showing a piezoelectric actuator of the first drive unit in FIG. 3.
Figure 5:
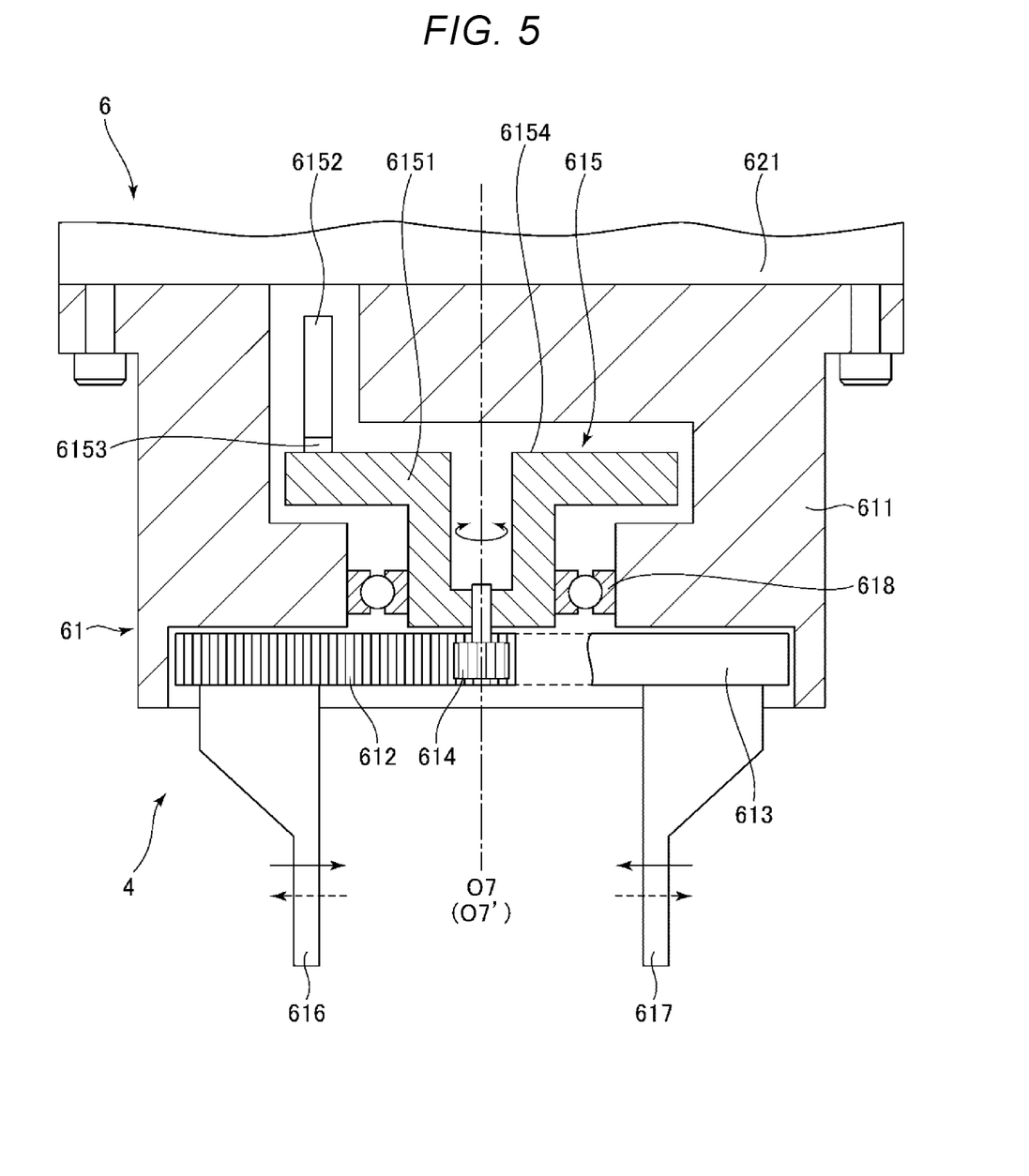
FIG. 5 is a sectional view showing a gripping part of the end effector in FIG. 2.
Figure 6:
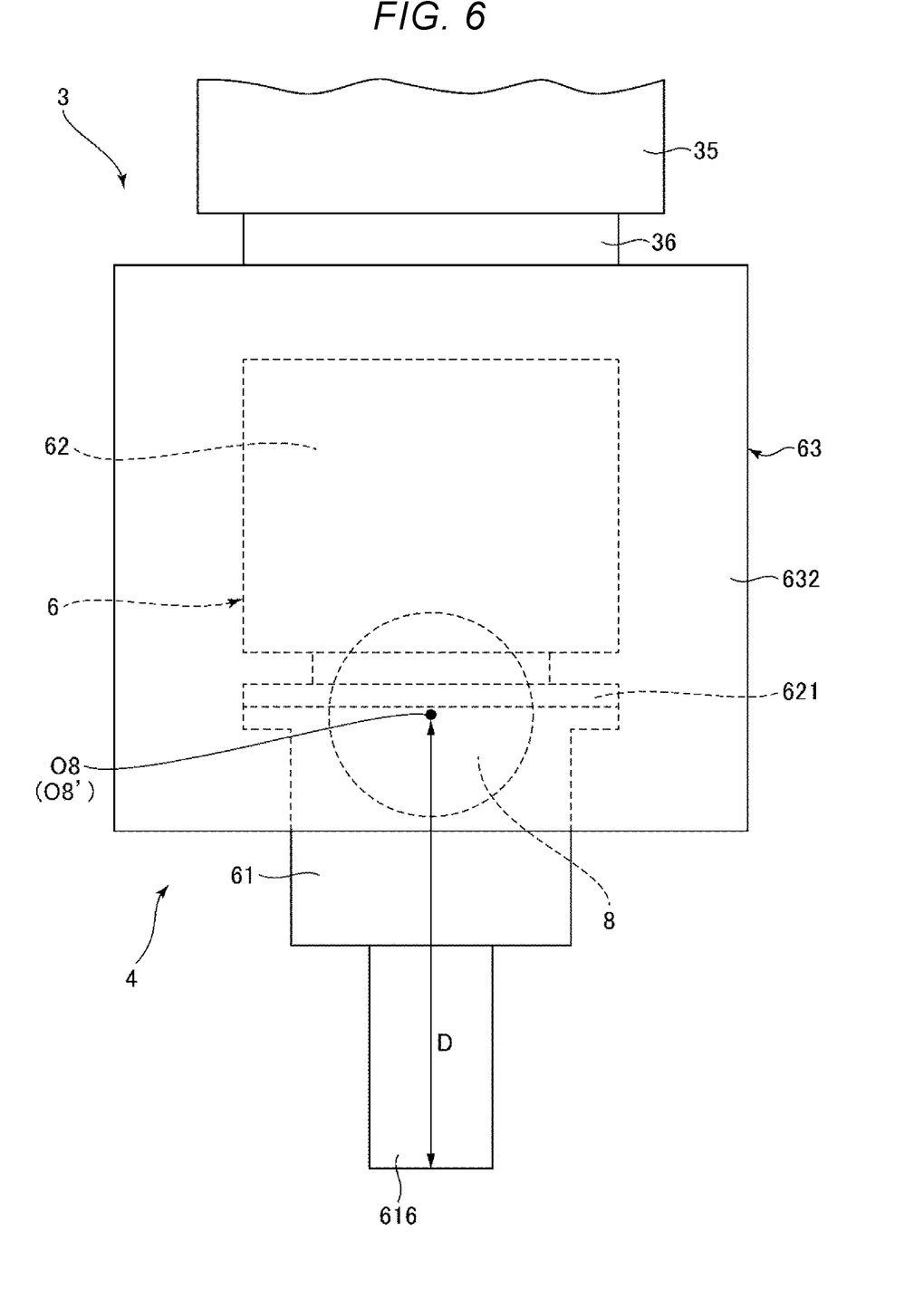
FIG. 6 is a plan view of the end effector in FIG. 2 as seen from a direction along a second pivot axis.
Figure 7:
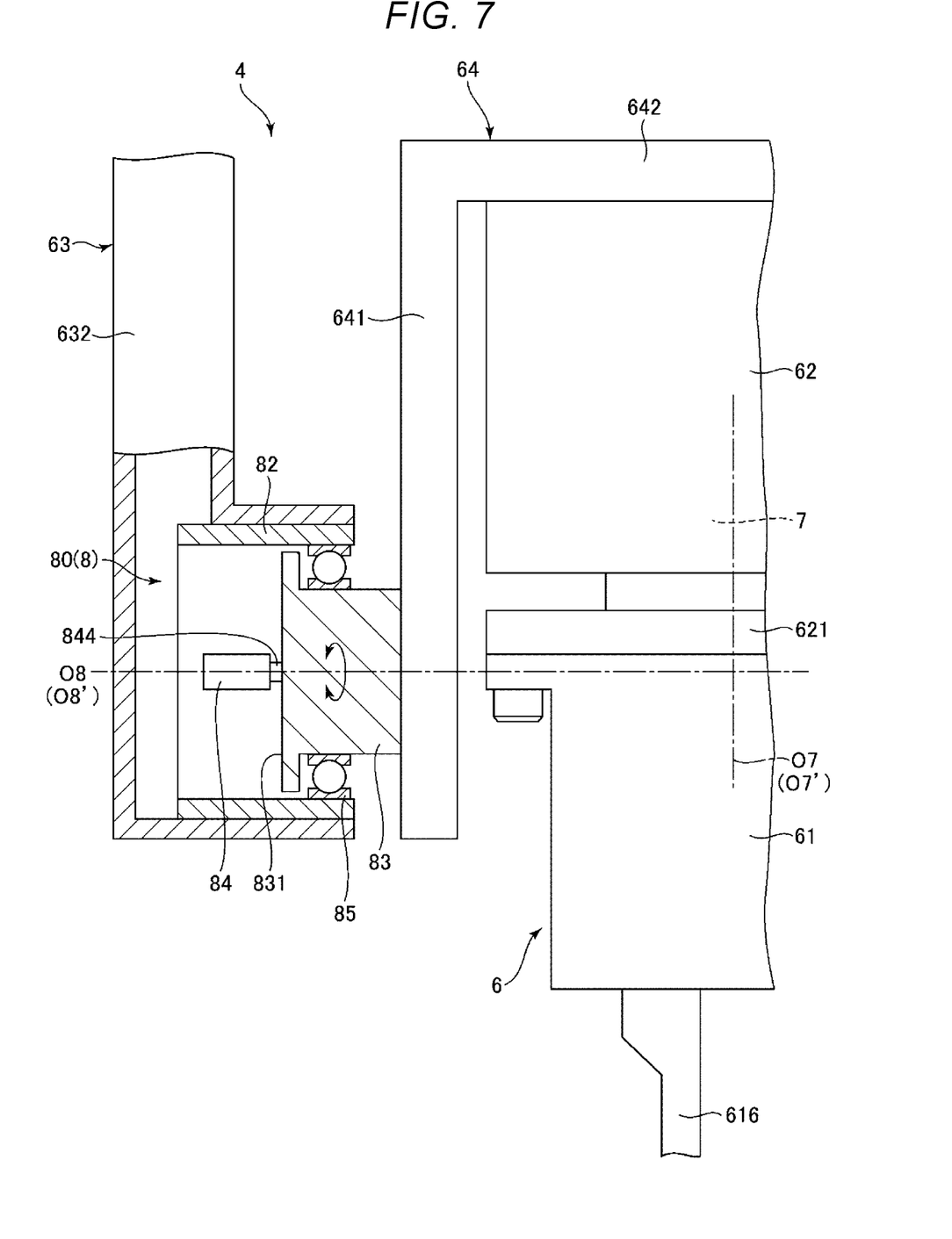
FIG. 7 is a sectional view showing a second drive unit of the end effector in FIG. 2.

FIG. 1 is the perspective view showing a robot according to the first embodiment of the present disclosure. FIG. 2 is the plan view showing an end effector of the robot. FIG. 3 is the sectional view showing a first drive unit of the end effector in FIG. 2. FIG. 4 is the plan view showing a piezoelectric actuator of the first drive unit in FIG. 3. FIG. 5 is the sectional view showing a gripping part of the end effector in FIG. 2. FIG. 6 is the plan view of the end effector in FIG. 2 as seen from the direction along the second pivot axis. FIG. 7 is the sectional view showing a second drive unit of the end effector in FIG. 2.

A robot 1 shown in FIG. 1 may perform work of e.g. feeding, removing, carrying, assembly, etc. of precision apparatuses and components forming the apparatuses. Note that the usage of the robot 1 is not limited to that. The robot 1 is a vertical articulated robot and has a base 2 and a robot arm 3. Further, the robot arm 3 has a first arm 31, a second arm 32, a third arm 33, a fourth arm 34, a fifth arm 35, a sixth arm 36, and an end effector 4. In the following description, the base 2 side of the robot arm 3 is also referred to as "proximal end" or "proximal end side" and an opposite side to the base 2, i.e., a side away from the base 2 is also referred to as "distal end" or "distal end side".

The base 2 is fixed to a floor, wall, ceiling, or the like. The first arm 31 is coupled to the base 2 at the proximal end side thereof pivotably about a first arm pivot axis O1. The second arm 32 is coupled to the first arm 31 at the proximal end side thereof pivotably about a second arm pivot axis O2 orthogonal to the first arm pivot axis O1. The third arm 33 is coupled to the second arm 32 at the proximal end side thereof pivotably about a third arm pivot axis O3 parallel to the second arm pivot axis O2. The fourth arm 34 is coupled to the third arm 33 at the proximal end side thereof pivotably about a fourth arm pivot axis O4 orthogonal to the third arm pivot axis O3. The fifth arm 35 is coupled to the fourth arm 34 at the proximal end side thereof pivotably about a fifth arm pivot axis O5 orthogonal to the fourth arm pivot axis O4. The sixth arm 36 is coupled to the fifth arm 35 at the proximal end side thereof pivotably about a sixth arm pivot axis O6 orthogonal to the fifth arm pivot axis O5. The end effector 4 is detachably attached to a distal end portion of the sixth arm 36. Note that, in the embodiment, the above described sixth arm 36 forms a third supporting part according to the present disclosure.

Regarding the first arm pivot axis O1 to the sixth arm pivot axis O6 and first, second pivot axes O7, O8, which will be described later, "orthogonal" includes cases where angles formed by two axes deviate within a range of ±5° from 90°, and "parallel" includes cases where one axis of two axes is inclined relative to the other within a range of ±5°.

Further, the robot 1 has a first arm drive unit 51 provided in a coupling part between the base 2 and the first arm 31 and pivoting the first arm 31 relative to the base 2, a second arm drive unit 52 provided in a coupling part between the first arm 31 and the second arm 32 and pivoting the second arm 32 relative to the first arm 31, a third arm drive unit 53 provided in a coupling part between the second arm 32 and the third arm 33 and pivoting the third arm 33 relative to the second arm 32, a fourth arm drive unit 54 provided in a coupling part between the third arm 33 and the fourth arm 34 and pivoting the fourth arm 34 relative to the third arm 33, a fifth arm drive unit 55 provided in a coupling part between the fourth arm 34 and the fifth arm 35 and pivoting the fifth arm 35 relative to the fourth arm 34, and a sixth arm drive unit 56 provided in a coupling part between the fifth arm 35 and the sixth arm 36 and pivoting the sixth arm 36 relative to the fifth arm 35. Note that, in the embodiment, the above described sixth arm drive unit 56 forms a third drive unit according to the present disclosure.

Each of the first arm drive unit 51 to the sixth arm drive unit 56 has e.g. a motor M as a drive source of the arm, a controller that controls driving of the motor M, a reducer, an encoder, etc. Note that the motor M is not particularly limited, but a piezoelectric motor using expansion and contraction of a piezoelectric element by energization is preferably used. Thereby, for example, compared to the case where an electromagnetic motor or the like is used as the motor M, the motor M may be downsized. Further, for example, the piezoelectric motor has an advantage in driving at a low speed and high torque compared to the electromagnetic motor and is suitable for driving of the robot 1 because of the property. Note that the configuration of the piezoelectric motor is not particularly limited, but e.g. the same configuration as that of piezoelectric motors 70, 80, which will be described later, may be employed.

As shown in FIG. 2, the end effector 4 has a distal end unit 6 including a gripping part 61 that grips a work and a first supporting part 62 that supports the gripping part 61, a first drive unit 7 that pivots the gripping part 61 about the first pivot axis O7 relative to the first supporting part 62, a second supporting part 63 that supports the first supporting part 62, a coupling part 64 that couples the distal end unit 6 and the second supporting part 63, and a second drive unit 8 that pivots the distal end unit 6 about the second pivot axis O8 orthogonal to the first pivot axis O7 relative to the second supporting part 63.

The gripping part 61 and the first supporting part 62 are placed along a first axis O7' and the first supporting part 62 is located at the proximal end side (the side coupling to the coupling part 64) of the gripping part 61. Further, the gripping part 61 is coupled to the first supporting part 62 pivotably about the first pivot axis O7 as an axis along the first axis O7', i.e., an axis coincident with or parallel to the first axis O7'. Furthermore, the first supporting part 62 has an attachment portion 621 that can detachably attach the gripping part 61 to a distal end part thereof. As described above, the gripping part 61 is detachably formed from the first supporting part 62, and thereby, the gripping part 61 may be easily replaced according to details of work. Further, the gripping part 61 may be easily maintained. Note that the attachment method of the gripping part 61 to the attachment portion 621 is not particularly limited, but may be any method including e.g. recess-projection fitting, threadably mounting, screwing, and magnetic suction.

As shown in FIG. 3, the first drive unit 7 includes the piezoelectric motor 70. The piezoelectric motor 70 has a housing 72, a rotor 73 rotatable relative to the housing 72, and a piezoelectric actuator 74 including a convex portion 744 in contact with a principal surface 731 of the rotor 73. The housing 72 is fixed to the first supporting part 62. The rotor 73 is supported by the housing 72 via a bearing 76 and rotatable about the first pivot axis O7 relative to the housing 72. Further, the attachment portion 621 is provided at the rotor 73. The piezoelectric actuator 74 is fixed to the housing 72 with the convex portion 744 pressed against the principal surface 731 of the rotor 73 by an urging member (not shown).

As shown in FIG. 4, the piezoelectric actuator 74 has a vibrator 741, a supporting portion 742 that supports the vibrator 741, a coupling portion 743 that couples the vibrator 741 and the supporting portion 742, and the convex portion 744 provided at the vibrator 741 and transmitting vibration of the vibrator 741 to the rotor 73. The piezoelectric actuator 74 is placed in a position eccentric from the first pivot axis O7, i.e., a position off the first pivot axis O7. In the illustrated configuration, the piezoelectric actuator is placed off the first pivot axis O7 toward the depth side of the paper surface. In the vibrator 741, five piezoelectric elements 745A to 745E are placed. These piezoelectric elements 745A to 745E are respectively configured to expand and contract in the longitudinal directions of the vibrator 741 and the piezoelectric elements 745A to 745E are expanded and contracted with predetermined timing, and thereby, the piezoelectric actuator 74 flexurally vibrates in S-shapes. The flexural vibration is transmitted to the rotor 73, and thereby, the rotor 73 rotates about the first pivot axis O7 relative to the housing 72.

The above described piezoelectric motor 70 can be downsized compared to e.g. another motor such as an electromagnetic motor. Accordingly, the end effector 4 may be downsized. Further, the piezoelectric motor 70 has a property of low speed and high torque compared to the electromagnetic motor, and the property is suitable for driving of the end effector 4. Accordingly, the end effector 4 that can drive more stably is obtained.

As shown in FIG. 5, the gripping part 61 has a base portion 611 detachably attached to the attachment portion 621 of the first supporting part 62, a pair of rack gears 612, 613 slidably supported relative to the base portion 611, a pinion gear 614 located between the rack gears 612, 613 and meshing with the gears, a pinion gear drive portion 615 that rotates the pinion gear 614 about a center shaft thereof, and a pair of finger portions 616, 617 fixed to the rack gears 612, 613. Note that, in the embodiment, the center shaft of the pinion gear 614 coincides with the first pivot axis O7.

When the pinion gear 614 is rotated by the pinion gear drive portion 615, the rack gears 612, 613 slide in opposite directions relative to the base portion 611, and thereby, the pair of finger portions 616, 617 open and close and may grip and release an object. The pinion gear drive portion 615 is not particularly limited, but e.g. a piezoelectric motor, electromagnetic motor, or the like may be used. In the case where the piezoelectric motor is used, the same configuration as that of the above described piezoelectric motor 70 may be used. In the embodiment, the pinion gear drive portion 615 has a rotor 6151 rotatably supported by a bearing 618 relative to the base portion 611 and a piezoelectric actuator 6152 that rotates the rotor 6151. Note that the piezoelectric actuator 6152 has the same configuration as the above described piezoelectric actuator 74, and a convex portion 6153 of the piezoelectric actuator 6152 is in contact with a position at a principal surface 6154 of the rotor 6151 eccentric from a pivot axis thereof.

As above, the gripping part 61 is explained, however, the configuration of the gripping part 61 is not limited to the illustrated configuration. For example, the number of finger portions is not particularly limited, but may be three or more. The mechanism of opening and closing the finger portions 616, 617 is not particularly limited, but e.g. a drive part that slides the finger portion 616 and a drive part that slides the finger portion 617 may be separately provided. The gripping part 61 of the embodiment has the configuration of gripping an object by the pair of finger portions 616, 617, however, may have e.g. a configuration having a suction part that suctions an object by negative pressure.

The second supporting part 63 has a base portion 631 supported by the sixth arm 36 and a distal end unit supporting portion 632 extending from the base portion 631 and supporting the distal end unit 6. The distal end unit supporting portion 632 and the distal end unit 6 are placed along the second pivot axis O8 as an axis along a second axis O8' orthogonal to the first axis O7', i.e., an axis coincident with or parallel to the second axis O8'. In other words, as shown in FIG. 6, the distal end unit supporting portion 632 and the distal end unit 6 overlap in the plan view from the direction along the second pivot axis O8.

As shown in FIG. 7, the second drive unit 8 is placed in the distal end unit supporting portion 632. Further, the second drive unit 8 includes the piezoelectric motor 80. The piezoelectric motor 80 has a piezoelectric actuator 84, and the piezoelectric actuator 84 has the same configuration as the above described piezoelectric actuator 74 of the piezoelectric motor 70.

That is, the piezoelectric motor 80 has a housing 82, a rotor 83 rotatable relative to the housing 82, and the piezoelectric actuator 84 including a convex portion 844 in contact with a principal surface 831 of the rotor 83. The housing 82 is fixed to the distal end part of the distal end unit supporting portion 632. The rotor 83 is supported by the housing 82 via a bearing 85 and rotatable about the second pivot axis O8 relative to the housing 82. The piezoelectric actuator 84 is fixed to the housing 82 with the convex portion 844 pressed against the principal surface 831 of the rotor 83 by an urging member (not shown). The piezoelectric actuator 84 is placed in a position eccentric from the second pivot axis O8, i.e., a position off the second pivot axis O8. In the illustrated configuration, the piezoelectric actuator is placed off the second pivot axis O8 toward the depth side of the paper surface. When the piezoelectric actuator 84 is flexurally vibrated in S-shapes, the vibration is transmitted to the rotor 83 and the rotor 83 rotates about the second pivot axis O8.

The coupling part 64 has an L-shape bending at a right angle in the middle. Specifically, the coupling part 64 has a first portion 641 extending in the direction along the first pivot axis O7 and a second portion 642 coupled to one end part of the first portion 641 and extending in the direction along the second pivot axis O8. The rotor 83 is fixed to the first portion 641 and the first supporting part 62 is fixed to the second portion 642. Accordingly, when the rotor 83 rotates by actuation of the piezoelectric actuator 84, the coupling part 64 and the distal end unit 6 pivot about the second pivot axis O8. Note that a gap 66 is formed between the second portion 642 and the base portion 631 in a size that may prevent contact between the coupling part 64 and the distal end unit 6 when the part and the unit pivot about the second pivot axis O8.

As shown in FIGS. 2 and 6, the second pivot axis O8 crosses the distal end unit 6. In other words, in the plan view from the direction along the second pivot axis O8, the second pivot axis O8 and the distal end unit 6 overlap. As described above, the second pivot axis O8 and the distal end unit 6 cross, and thereby, a distance D from the second pivot axis O8 to the distal end of the gripping part 61 is shorter and the distal end unit 6 may be pivoted about the second pivot axis O8 within a smaller region. Accordingly, work in a smaller area may be easily performed. Particularly, in the embodiment, the second pivot axis O8 and the first pivot axis O7 cross. Thereby, the above described effect may be exerted more remarkably. Note that the second pivot axis O8 and the first pivot axis O7 may be skew, not cross.

In the plan view from the direction along the second pivot axis O8 (second axis O8'), the second drive unit 8 and the distal end unit 6 overlap. In other words, the second drive unit 8 and the distal end unit 6 are placed along the second pivot axis O8. Thereby, the entire length of the end effector 4 may be made shorter and the robot arm 3 may be downsized. Particularly, in the embodiment, in the plan view from the direction along the second pivot axis O8, the second drive unit 8 and the gripping part 61 overlap. Thereby, the entire length of the end effector 4 may be made even shorter and the robot arm 3 may be further downsized. Note that the overlap between the second drive unit 8 and the distal end unit 6 refers to e.g. an overlap between at least a part of the distal end unit 6 and at least one of the housing 82 and the rotor 83 of the second drive unit 8 in the plan view from the direction along the second pivot axis O8. Further, the overlap between the second drive unit 8 and the gripping part 61 refers to e.g. an overlap between at least a part of a rotation surface of the gripping part 61 rotated about the first pivot axis O7 and at least one of the housing 82 and the rotor 83 of the second drive unit 8 in the plan view from the direction along the second pivot axis O8.

In the plan view from the direction along the second pivot axis O8 (second axis O8'), the second drive unit 8 and the attachment portion 621 overlap. Thereby, the second pivot axis O8 and the distal end unit 6 may be crossed substantially in the center part in the entire length direction of the distal end unit 6, and the distal end unit 6 may be pivoted about the second pivot axis O8 in a smaller region. Note that the overlap between the second drive unit 8 and the attachment portion 621 refers to e.g. an overlap between at least a part of the attachment portion 621 and at least one of the housing 82 and the rotor 83 of the second drive unit 8 in the plan view from the direction along the second pivot axis O8.

As above, the robot 1 is explained. As described above, the robot arm 3 of the robot 1 has the distal end unit 6 including the gripping part 61 and the first supporting part 62 that supports the gripping part 61, the first drive unit 7 that, with the axis along the direction in which the gripping part 61 and the first supporting part 62 are arranged as the first axis O7', pivots the gripping part 61 about the first pivot axis O7 along the first axis O7' relative to the first supporting part 62, the second supporting part 63 that supports the first supporting part 62, and the second drive unit 8 that, with the axis orthogonal to the first pivot axis O7 as the second axis O8', pivots the distal end unit 6 about the second pivot axis O8 along the second axis O8' relative to the second supporting part 63. The first drive unit 7 includes the piezoelectric motor 70. The second pivot axis O8 crosses the distal end unit 6. As described above, the second pivot axis O8 and the distal end unit 6 cross, and thereby, the distance D from the second pivot axis O8 to the distal end of the gripping part 61 is shorter and the distal end unit 6 may be pivoted about the second pivot axis O8 within a smaller region. Further, the first drive unit 7 includes the piezoelectric motor 70, and thereby, for example, compared to the case where the first drive unit 7 includes an electromagnetic motor, the robot arm 3 may be downsized. Accordingly, the robot arm 3 that may easily perform work in a smaller area is obtained.

As described above, the second pivot axis O8 crosses the first pivot axis O7. Thereby, the distal end unit 6 may be pivoted about the second pivot axis O8 within an even smaller region. Accordingly, the robot arm 3 that may easily perform work in a smaller area is obtained.

As described above, the second drive unit 8 includes the piezoelectric motor 80. Thereby, for example, compared to the case where the second drive unit 8 is an electromagnetic motor, the robot arm 3 may be downsized.

As described above, the robot arm 3 has the sixth arm 36 as the third supporting part that supports the second supporting part 63, and the sixth arm drive unit 56 as the third drive unit that, with an axis orthogonal to the second pivot axis O8 as a third axis O6', pivots the second supporting part 63 about the sixth arm pivot axis O6 along the third axis O6' as a third pivot axis relative to the sixth arm 36. Thereby, the posture of the gripping part 61 may be changed more freely and the highly convenient robot arm 3 is obtained.

Second Embodiment

Figure 8:
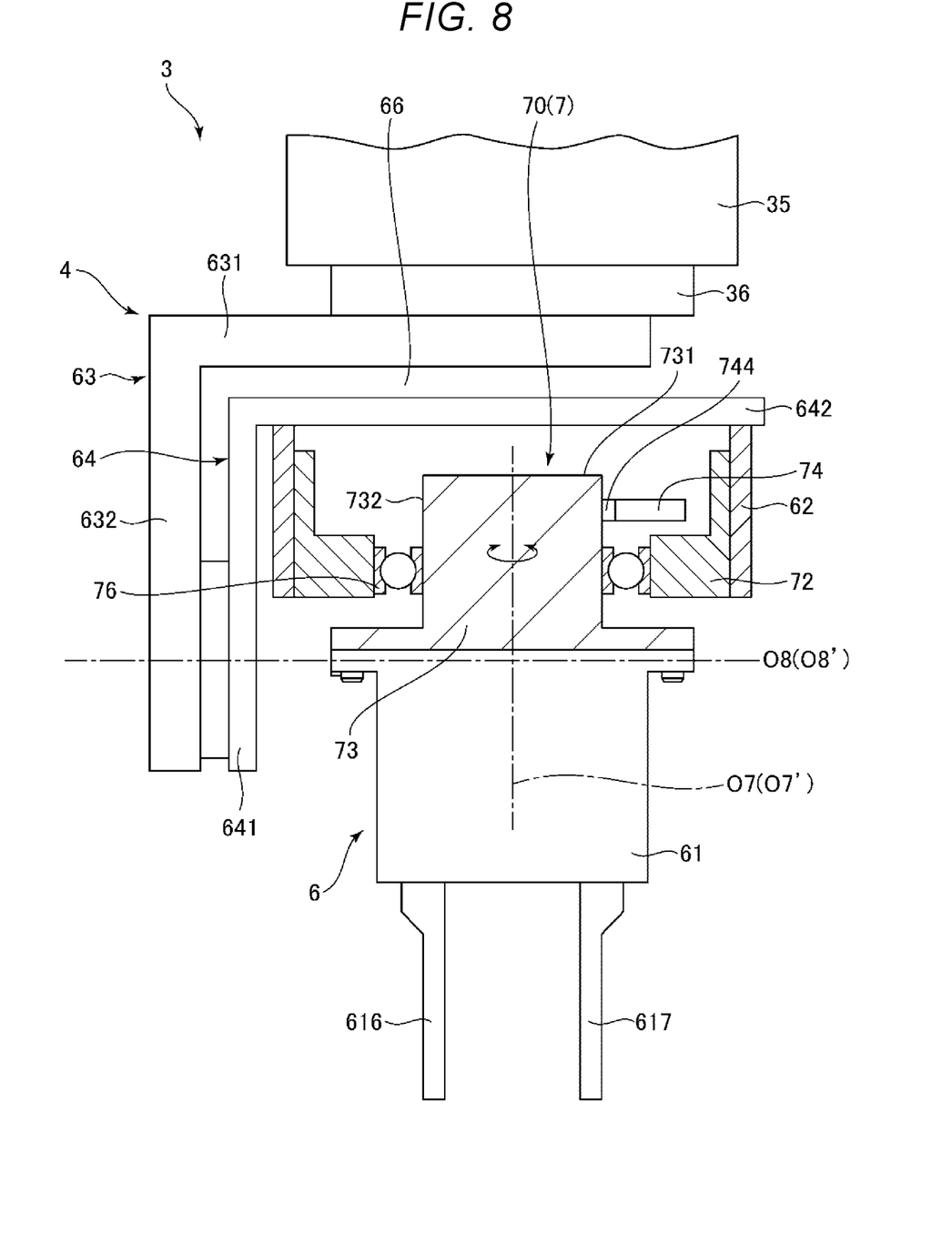
FIG. 8 is a sectional view showing an end effector of a robot according to a second embodiment of the present disclosure.

FIG. 8 is the sectional view showing an end effector of a robot according to the second embodiment of the present disclosure.

The robot 1 according to the embodiment is the same as that of the above described first embodiment except that the configuration of the first drive unit 7 of the end effector 4 is different. In the following description, the robot 1 of the second embodiment will be explained with a focus on the differences from the above described first embodiment, and the explanation of the same items will be omitted. In FIG. 8, the same configurations as those of the above described first embodiment have the same signs.

As shown in FIG. 8, in the piezoelectric motor 70 of the first drive unit 7 of the embodiment, the piezoelectric actuator 74 is in contact with a side surface 732 as an outer circumferential surface of the rotor 73. The piezoelectric actuator 74 has the convex portion 744 that transmits vibration and is fixed to the housing 72 with the convex portion 744 pressed against the side surface 732 via an urging member. According to the configuration, for example, compared to the case where the piezoelectric actuator 74 is in contact with the principal surface 731 of the rotor 73 like the above described first embodiment, the piezoelectric motor 70 may be made thinner. Accordingly, the entire length (the length along the first pivot axis O7) of the distal end unit 6 may be made shorter and the distal end unit 6 may be pivoted about the second pivot axis O8 in a smaller region.

Also, according to the second embodiment, the same effects as those of the above described first embodiment may be exerted.

As above, the robot arm according to the present disclosure is explained based on the illustrated embodiments, however, the present disclosure is not limited to those. The configurations of the respective parts may be replaced by arbitrary configurations having the same functions. Further, another arbitrary configuration may be added to the present disclosure. Furthermore, the above described respective embodiments may be combined as appropriate.

In the above described embodiments, the configuration of the robot 1 as the six-axis robot is explained, however, the robot 1 is not particularly limited, but may be e.g. a dual-arm robot, scalar robot, or the like.

What is claimed is:

1. A robot arm comprising:
an arm segment;
an end effector having a gripper, a first support, a second support, and a coupler, the gripper being attached to a distal end of the first support, the second support being detachably coupled to a distal end of the arm segment, and the coupler being attached to a proximal end of the first support and a distal end of the second support;
a first driver configured to pivot the gripper about a first pivot axis relative to the first support, the first pivot axis extending along a length of the gripper and a length of the first support to intersect a connection between the first support and the coupler; and
a second driver configured to pivot the gripper about a second pivot axis relative to the second support, the second support being coupled to the coupler along the second pivot axis, and the second pivot axis extending orthogonal to the first pivot axis, wherein
the first driver includes a piezoelectric motor,
the second pivot axis crosses the gripper,
the second support of the end effector is an L-shaped support having a first arm and a second arm extending orthogonal to the first arm, the first arm of the second support being directly rotatably coupled to the distal end of the arm segment to rotate about a third pivot axis relative to the arm segment, the third pivot axis extending orthogonal to the second pivot axis and the third pivot axis extending parallel with the first pivot axis when the coupler is in a first position,
the coupler is an L-shaped coupler having a first arm and a second arm extending orthogonal to the first arm,
the first arm of the coupler is directly rotatably coupled to a distal end of the second arm of the second support,
the second arm of the coupler is directly coupled to the first support, and
the first pivot axis is a longitudinal axis through the first support and extends parallel with a longitudinal axis of the first arm of the coupler.

2. The robot arm according to claim 1, wherein the second pivot axis crosses the first pivot axis.

3. The robot arm according to claim 1, wherein the second driver includes a piezoelectric motor.

4. The robot arm according to claim 1, wherein in a plan view from a direction along the second axis, the second driver, and the end effector overlap.

5. The robot arm according to claim 4, wherein in the plan view from the direction along the second axis, the second driver, and the gripper overlap.

6. The robot arm according to claim 1, further comprising:
a third support that supports the second support; and
a third driver that pivots the second support about the third pivot axis relative to the third support.

7. The robot arm according to claim 1, wherein the first support has an attachment to which the gripper is attached, and
in a plan view from a direction along the second pivot axis, the second driver and the attachment overlap.

* * * * *